United States Patent
Ohzuku et al.

(10) Patent No.: US 8,673,505 B2
(45) Date of Patent: Mar. 18, 2014

(54) NON-AQUEOUS ELECTROLYTE SECONDARY BATTERY

(75) Inventors: Tsutomu Ohzuku, Nara (JP); Hiroshi Yoshizawa, Osaka (JP)

(73) Assignees: Panasonic Corporation, Osaka (JP); Public University Corporate Osaka City University, Osaka (JP)

(*) Notice: Subject to any disclaimer, the term of this patent is extended or adjusted under 35 U.S.C. 154(b) by 1161 days.

(21) Appl. No.: 11/730,304

(22) Filed: Mar. 30, 2007

(65) Prior Publication Data

US 2007/0231705 A1  Oct. 4, 2007

Related U.S. Application Data

(60) Provisional application No. 60/795,166, filed on Apr. 27, 2006.

(30) Foreign Application Priority Data

Mar. 31, 2006 (JP) .................................. 2006-100537

(51) Int. Cl.
*H01M 10/36* (2010.01)
*H01M 10/40* (2006.01)
*H01M 4/48* (2010.01)

(52) U.S. Cl.
USPC ............ 429/324; 429/231.1; 429/231.3; 429/231.5; 429/224; 429/339

(58) Field of Classification Search
USPC ......... 429/66, 152, 231.1, 231.35, 224, 218.1
IPC ............................................... H01M 4/48,4/50
See application file for complete search history.

(56) References Cited

U.S. PATENT DOCUMENTS

| | | | |
|---|---|---|---|
| 5,721,067 A * | 2/1998 | Jacobs et al. | 429/60 |
| 5,759,720 A * | 6/1998 | Amatucci | 429/224 |
| 6,274,271 B1 * | 8/2001 | Koshiba et al. | 429/231.1 |
| 6,440,608 B1 | 8/2002 | Yoshioka et al. | |
| 6,482,550 B1 * | 11/2002 | Imachi et al. | 429/338 |
| 6,730,435 B1 * | 5/2004 | Nakane et al. | 429/218.1 |
| 6,806,003 B1 | 10/2004 | Yamaguchi et al. | |
| 2002/0076605 A1 | 6/2002 | Akashi et al. | |
| 2002/0102466 A1 * | 8/2002 | Hwang et al. | 429/326 |
| 2003/0134190 A1 * | 7/2003 | Ishida et al. | 429/162 |

(Continued)

FOREIGN PATENT DOCUMENTS

| | | |
|---|---|---|
| CN | 1258384 | 6/2000 |
| CN | 1301052 A | 6/2001 |

(Continued)

OTHER PUBLICATIONS

Machine translation of Oshiki (JP2002-289194).*

(Continued)

*Primary Examiner* — Jun Li
(74) *Attorney, Agent, or Firm* — McDermott Will & Emery LLP

(57) ABSTRACT

A non-aqueous electrolyte secondary battery including a unit cell including a positive electrode, a negative electrode, a separator disposed between the positive electrode and the negative electrode, and a non-aqueous electrolyte, the positive electrode capacity being greater than the negative electrode capacity, and at least a portion of the non-aqueous electrolyte is gasified during charging.

21 Claims, 12 Drawing Sheets

(56) References Cited

U.S. PATENT DOCUMENTS

| | | | |
|---|---|---|---|
| 2004/0013946 A1* | 1/2004 | Abe et al. | 429/326 |
| 2004/0076882 A1* | 4/2004 | Hosoya et al. | 429/223 |
| 2004/0121236 A1 | 6/2004 | Shen et al. | |
| 2004/0191161 A1 | 9/2004 | Wang et al. | |
| 2004/0223906 A1 | 11/2004 | Wang et al. | |
| 2004/0224232 A1 | 11/2004 | Yamaguchi et al. | |
| 2004/0258986 A1 | 12/2004 | Shen et al. | |
| 2005/0019659 A1* | 1/2005 | Shiozaki et al. | 429/231.3 |
| 2005/0037263 A1 | 2/2005 | Wang et al. | |
| 2005/0048360 A1 | 3/2005 | Wang | |
| 2005/0048361 A1 | 3/2005 | Wang et al. | |
| 2005/0053545 A1 | 3/2005 | Liu et al. | |
| 2005/0084750 A1 | 4/2005 | Wang et al. | |
| 2005/0130042 A1 | 6/2005 | Liu et al. | |
| 2007/0218367 A1 | 9/2007 | Yamaguchi et al. | |

FOREIGN PATENT DOCUMENTS

| | | | |
|---|---|---|---|
| CN | 1363965 A | 8/2002 | |
| CN | 1627550 | 6/2005 | |
| JP | 7-335261 | 12/1995 | |
| JP | 8-22841 | 1/1996 | |
| JP | 10-27609 | 1/1998 | |
| JP | 10-106626 | 4/1998 | |
| JP | 2003-323893 | 11/2003 | |
| JP | 2005-142047 | 6/2005 | |
| WO | WO 2005/018038 A2 | 2/2005 | |
| WO | WO2005018038 * | 2/2005 | H01M 10/04 |

OTHER PUBLICATIONS

Machine translation of Liu (CN1627550).*

Chinese Office Action, with English translation, issued in Chinese Patent Application No. CN 2007100919923, mailed Jul. 25, 2008.

Buhrmester., et al.,"Studies of Aromatic Redox Shuttle Additives for $LiFePO_4$-Based Li-Ion Cells", Journal of the Electrochemical Society, 2005, pp. A2390-A2399, vol. 152 No. 12, The Electrochemical Society, Inc.

Chinese Office Action, w/ English translation thereof, issued in Chinese Patent Application No. CN 2007100919923 dated May 22, 2009.

Chinese Office Action, w/ English translation thereof, issued in Chinese Patent Application No. CN 200710091992.3 dated Sep. 25, 2009.

* cited by examiner

NON-AQUEOUS ELECTROLYTE SECONDARY BATTERY

RELATED APPLICATIONS

The present application claims priority from Japanese Application No. 2006-100537 filed on Mar. 31, 2006 and U.S. Provisional Application No. 60/795,166 filed on Apr 27, 2006, the contents of which are hereby incorporated by reference into this application.

FIELD OF THE INVENTION

The present invention relates to non-aqueous electrolyte secondary batteries.

BACKGROUND OF THE INVENTION

Lead-acid batteries are excellent in high-rate discharge performance, and are still widely used industrially, considering long-term reliability and costs. Such lead-acid batteries are used particularly as a battery for starters for automobiles, and as various industrial and business backup power sources. Future trends in lead-acid batteries of the two fields, i.e., starter batteries and backup power sources, can be considered as in the following.

In the field of backup power sources, there is a growing tendency to replace lead-acid batteries with nickel-metal hydride storage batteries or non-aqueous electrolyte secondary batteries (lithium ion battery). Main reasons for the replacement are demands for downsizing power sources by replacing lead-acid batteries with batteries having further higher energy density, and demands for environmentally friendly batteries instead of batteries using lead in view of environmental load. Regarding the lead-acid battery for automobile starters, although there is no significant step for the replacement, examination for practical use of lithium ion batteries for power sources for stop-idling vehicles has been started. In hybrid cars such as PRIUS (product name), nickel-metal hydride storage batteries are already used.

Particularly, lithium ion batteries have been used actually as a small mobile power source for 10 or more years, and during the period, techniques for securing higher safety and reliability have been achieved without sacrificing its characteristic high energy density. Lithium ion batteries have also been achieving cost reduction for industrial application. From these points mentioned above, in the above two fields, the trend towards the use of lithium ion batteries to replace lead-acid batteries is considered to further grow in the future.

Lithium ion batteries used as main power sources of mobile electronic devices have the following components. For the positive electrode active material to be included in the positive electrode, lithium cobaltate ($LiCoO_2$), lithium nickel manganese cobalt oxide ($LiNi_{1/2-x}Mn_{1/2-x}Co_xO_2$) or spinel lithium manganese oxide ($LiMn_2O_4$) is used. These positive electrode active materials have a voltage of 4 V or more relative to lithium. For the negative electrode, carbon materials are generally used, which achieve a lithium ion battery of 4 V class when being used with the above positive electrode. Other than such types, various types of batteries have been proposed. For example, in view of higher safety, use of for example olivine lithium iron phosphate ($LiFePO_4$) in the positive electrode is proposed, and in view of further higher energy density, use of a silicon alloy in the negative electrode is proposed.

On the other hand, in battery packs in which a plurality of batteries are connected in series or in parallel, and in so-called battery modules in which a plurality of unit cells are installed in a single container, there is a definitive difference between aqueous solution-type batteries such as lead-acid batteries and nickel-metal hydride batteries, and non-aqueous electrolyte-type batteries such as lithium ion batteries. Battery modules are the batteries such as lead-acid batteries for 12 V vehicles, and prismatic nickel-metal hydride batteries for hybrid cars. The above battery modules are obtained, for example, by forming a plurality of spaces in a resin-made container with partitions, installing a unit cell in each space, and connecting the unit cells in series via holes passing through the partitions.

In the above aqueous solution-type batteries, over-charge protection is achieved by so-called Neumann mechanism using the electrolysis of water. For example, nickel-metal hydride storage batteries are designed so that the negative electrode capacity is larger than the positive electrode capacity. With such a design, the irreversible capacity necessary for the formation of the positive electrode is charged in the negative electrode at the initial charging, and as a result, the negative electrode becomes able to take charge of both the discharge reserve and charge reserve. By forming the battery with such a design, oxygen generated from the positive electrode at the time of overcharged state can be adsorbed by the negative electrode, and hydrogen generated at the time of reverse charging (over-discharge) can be adsorbed by the negative electrode.

Therefore, in battery modules and battery packs, there is no need for controlling the charging in each unit cell having a voltage of 1.2 V, and a group of a plurality of unit cells in series having a voltage such as 6 V, 12 V, or 24 V can be controlled as a single unit for the charging. However, in lithium ion batteries currently in practical use, the charging control has to be carried out in each unit cell for the overcharge protection, since the principle of the Neumann mechanism mentioned in the above does not work. Thus, when lithium ion batteries are used in the above two fields including a plurality of unit cells, there is a problem of cost increase since the charging has to be controlled for each unit cell. Although it may be possible to observe a battery voltage in each unit cell and to control the current only at the both ends of the above group, this is not so effective since the charging has to be ended at the unit cell with the least capacity.

In view of the above conventional technology, the present invention mainly focuses on achieving a non-aqueous electrolyte secondary battery which can achieve particularly the overcharge protection by internal chemistry without depending on external electronic circuit, as a replacement for lead-acid batteries.

Relating to such non-aqueous electrolyte secondary batteries, for example, Japanese Laid-Open Patent Publication No. Hei 8-22841 has proposed a non-aqueous electrolyte battery system which can endure over-discharge in a battery pack (integrated battery). In this publication, the spinel-type lithium-containing metal oxide is used for the active material of both of the positive electrode and the negative electrode: to be specific, lithium manganese oxide ($Li_{1.05}Mn_{0.95}O_4$) is used for the positive electrode active material, and lithium titanium oxide ($Li_{1.035}Ti_{1.965}O_4$) is used for the negative electrode active material. Since Ti has an average valence of 3.5, $Li_{1.035}Ti_{1.965}O_4$ in the negative electrode can be oxidized by releasing Li at the time of over-discharge (reverse charging) until Ti has a valence of four. At the same time, Japanese Laid-Open Patent Publication No. Hei 8-22841 describes that since Mn has an average valence of 3.6, $Li_{1.05}Mn_{1.95}O_4$ in the positive electrode can adsorb Li until Mn has a valence of three. Therefore, reversibility of the active material is not deteriorated even in the over-discharge (reverse charging) state.

However, Japanese Laid-Open Patent Publication No. Hei 8-22841 does not mention the overcharge protection. Regarding the balance between the positive electrode active material capacity and the negative electrode active material capacity as well, no particular consideration seems to be taken, even in view of the description in Examples. Also, there is no particular matter to be noted regarding non-aqueous electrolyte, and "a mixed solution of ethylene carbonate (EC) and diethylcarbonate (DEC) in which $LiPF_6$ was dissolved in 1 mol/liter" shown in Example is currently in general use in lithium ion batteries.

Additionally, in Journal of Electrochemical Society, 152, 2390 (2005) by J. R. Dahn et al., techniques for overcharge protection in lithium ion batteries are proposed. This relates to the technique called redox shuttle, and is characterized in that an additive with redox capability is added to a generally used non-aqueous electrolyte. The journal notes that the additive is oxidized in the positive electrode at the time of overcharged state, the oxidized additive diffuses into the negative electrode, and reverse reactions occur in the negative electrode to consume overcharge current. To be specific, the journal shows that in the system using the positive electrode active material including $LiFePO_4$ and the negative electrode active material including $Li_{4/3}Ti_{5/3}O_4$, 2,5-di-t-butyl-1,4-dimethoxybenzene is promising for the redox shuttle (additive).

However, although this concept of the redox shuttle has been proposed so far, it has a critical problem: the reaction speed of the shuttle is slow, and in batteries in practical use, the overcharge rate that can be used for the overcharge protection cannot be secured. Also, with the electrochemical reaction of oxidation and reduction, heat reaction that cannot be disregarded occurs, which renders the redox shuttle concept unrealistic.

Japanese Laid-Open Patent Publication No. Hei 7-335261 has disclosed a battery using the positive electrode including lithium cobaltate ($LiCoO_2$), and the negative electrode including lithium titanate ($Li_{4/3}Ti_{5/3}O_4$). Japanese Laid-Open Patent Publication No. Hei 7-335261 mentions the balance between the positive electrode capacity and the negative electrode capacity, and according to this publication, the negative electrode capacity is preferably set to the rate of 0.6 to below 1.0 to the positive electrode capacity, and the battery capacity is preferably regulated by the negative electrode capacity (negative electrode capacity regulation). However, the publication just mentions that the negative electrode capacity regulation is preferable in view of cycle life, and there is no mention regarding protection for overcharge and overdischarge.

Further, Japanese Laid-Open Patent Publication No. Hei 10-27609 shows a battery using the following: the negative electrode active material including lithium or a lithium alloy, or a spinel structure lithium-titanium oxide; the positive electrode active material including a spinel structure lithium-manganese oxide, $Li_{4/3}Mn_{5/3}O_4$; and a non-aqueous electrolyte in which $LiN(CF_3SO_2)_2$ is dissolved in a solvent mixture of two or more components including ethylene carbonate. However, Japanese Laid-Open Patent Publication No. Hei 10-27609 merely intends to improve cycle life and storage characteristics, by optimizing the electrolyte.

Also, for the prior art relating to the replacement for lead-acid batteries as mentioned above, for example, Japanese Laid-Open Patent Publication No. 2003-323893 and Japanese Laid-Open Patent Publication No. 2005-142047 may be mentioned. And in Japanese Laid-Open Patent Publication No. Hei 10-106626, aiming to achieve a non-aqueous electrolyte with a high conductivity, an electrolyte including acetonitrile as a solvent is proposed.

As mentioned above, in a battery pack including a plurality of unit cells connected in series or in parallel, and in a battery module in which a plurality of unit cells are installed in single container, there is a definitive difference between aqueous solution-type batteries in which Neumann mechanism works (such as lead-acid batteries and nickel-metal hydride batteries,) and non-aqueous electrolyte-type batteries in which Neumann mechanism does not work (such as currently used lithium ion batteries). For example, in lead-acid batteries for automobiles, charging and discharging can be controlled by controlling only the voltage of at both ends of a 12 V battery, in which six unit cells connected in series are included in a container. However, in lithium ion batteries including a plurality of unit cells, when there is a difference between the capacities of the unit cells, even a minute difference, charging and discharging cannot be controlled by controlling only the voltages at both ends of the plurality of unit cells, and overcharge and overdischarge occur unless the unit cell is controlled, leading to a significant decline in safety and reliability. When lithium ion batteries are used for industrial backup power sources which require high voltage and output, and for power sources for automobiles, it is highly costly to control each unit cell.

The present invention is for solving these problems, and aims to provide a non-aqueous electrolyte secondary battery that can achieve particularly the overcharge protection with its internal chemistry without depending on an external electronic circuit, for replacing lead-acid batteries. To be more specific, the present invention aims to provide a non-aqueous electrolyte secondary battery with a battery chemistry that enables the following: protection for both overcharge and overdischarge (reverse charging), by appropriately selecting the combination of the positive electrode active material, the negative electrode active material, and the electrolyte, and the balance between the positive electrode capacity and the negative electrode capacity; and simplification of the control over battery packs and battery modules.

BRIEF SUMMARY OF THE INVENTION

To solve the above problem, the present invention provides a non-aqueous electrolyte secondary battery comprising: a unit cell including a positive electrode, a negative electrode, a separator interposed between the positive electrode and the negative electrode, and a non-aqueous electrolyte, wherein a positive electrode capacity is larger than a negative electrode capacity, and at least a portion of the non-aqueous electrolyte is gasified.

Based on such a battery, even though the negative electrode capacity is smaller than the positive electrode capacity, at least a portion of the non-aqueous electrolyte is decomposed to supplement the negative electrode capacity (quasi-Neumann mechanism), and deterioration from overcharge, and even overdischarge (reverse charging) by selecting appropriate material composition, can be curbed.

The present invention also provides a non-aqueous electrolyte secondary battery comprising a unit cell including a positive electrode, a negative electrode, a separator disposed between the positive electrode and the negative electrode, and a non-aqueous electrolyte, wherein the positive electrode includes a positive electrode active material comprising a lithium composite oxide having the spinel structure and represented by the general formula:

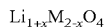

where M is at least Mn and Al, and x>0;

the negative electrode includes a negative electrode active material comprising titanium oxide having the spinel structure; and the non-aqueous electrolyte includes acetonitrile as a main solvent.

The main solvent refers to a solvent component that takes up 50 vol % or more of the solvent as a whole.

Based on such a battery, the positive electrode becomes stable under a high potential range, the impedance becomes lower by the electrolyte including acetonitrile, and rate performance becomes excellent.

A non-aqueous electrolyte secondary battery of the present invention may be used as a battery pack or a battery module including a plurality of the unit cells.

In such a case, by the quasi-Neumann mechanism mentioned above, the unit cell with a small capacity is supplemented by the unit cell with a large capacity to compensate the capacity variation between the unit cells in the battery pack or the battery module as a whole, and deterioration from not only overdischarge, but also overcharge can be curbed.

In the above non-aqueous electrolyte secondary battery, at least a portion of the non-aqueous electrolyte is preferably gasified in the proximity of the negative electrode.

Also, the at least a portion of the non-aqueous electrolyte is preferably gasified in a range of 1.5 V to 0.3 V relative to lithium metal.

The non-aqueous electrolyte secondary battery preferably includes a metal electrode for the gasification in addition to the negative electrode and the positive electrode. For the metal electrode, at least one selected from the group consisting of nickel, copper, iron, and stainless steel is preferably used. Thus, the metal electrode may also be formed of an alloy including at least two selected from the group consisting of nickel, copper, iron, and stainless steel.

The negative electrode preferably includes a lithium-containing titanium oxide.

The lithium-containing titanium oxide is preferably $Li_{3+3x}Ti_{6-3x}O_{12}$ where $0 \le x \le 1/3$.

The lithium-containing titanium oxide is preferably a mixture of a crystal particle having a particle size of 0.1 μm to 8 μm, and a secondary particle comprising the crystal particle and having a particle size of 2 μm to 30 μm.

The negative electrode preferably comprises a current collector including aluminum or an aluminum alloy.

The non-aqueous electrolyte preferably contains a nitrile compound as the solvent, for the component to be gasified at the time of charging.

The nitrile compound is preferably a mononitrile compound. The mononitrile compound is preferably acetonitrile or propionitrile, for example.

The nitrile compound preferably further includes a dinitrile compound. The dinitrile compound preferably is, for example, malononitrile, succinonitrile, glutaronitrile, or adiponitrile.

The non-aqueous electrolyte preferably contains methyl acetate, methyl butyrate, or γ-butyrolactone as a solvent.

The positive electrode preferably includes a lithium-containing manganese composite oxide having a spinel structure as a positive electrode active material. The lithium-containing manganese composite oxide having the spinel structure is preferably $Li_{1+x}Mn_{2-x-y}A_yO_4$ where A is at least one selected from the group consisting of Al, Ni, and Fe, $0 \le x \le 1/3$, and $0 \le y \le 0.6$.

The positive electrode preferably includes a layer-structured $Li_{1+\alpha}[Me]O_2$ where Me is a transition metal including Ni and at least one selected from the group consisting of Mn, Fe, Co, Ti, and Cu, and $0 \le \alpha y \le 0.2$, as the positive electrode active material. The positive electrode active material is preferably $Li_{1+\alpha}[Ni_{1/2-z}Mn_{1/2-z}Co_{2z}]O_2$ where $0 \le \alpha \le 0.2$, and $z \le 1/6$.

Based on the present invention, a non-aqueous electrolyte secondary battery that is not easily deteriorated by overcharge and overdischarge (reverse charging) can be provided. Also, in the case of including a plurality of unit cells, the protection for overcharge and overdischarge can be done by battery chemistry to compensate the capacity variation between the unit cells without depending on an external control circuit. Thus, a non-aqueous electrolyte secondary battery which enables simplification of control over a battery pack and a battery module can be provided.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
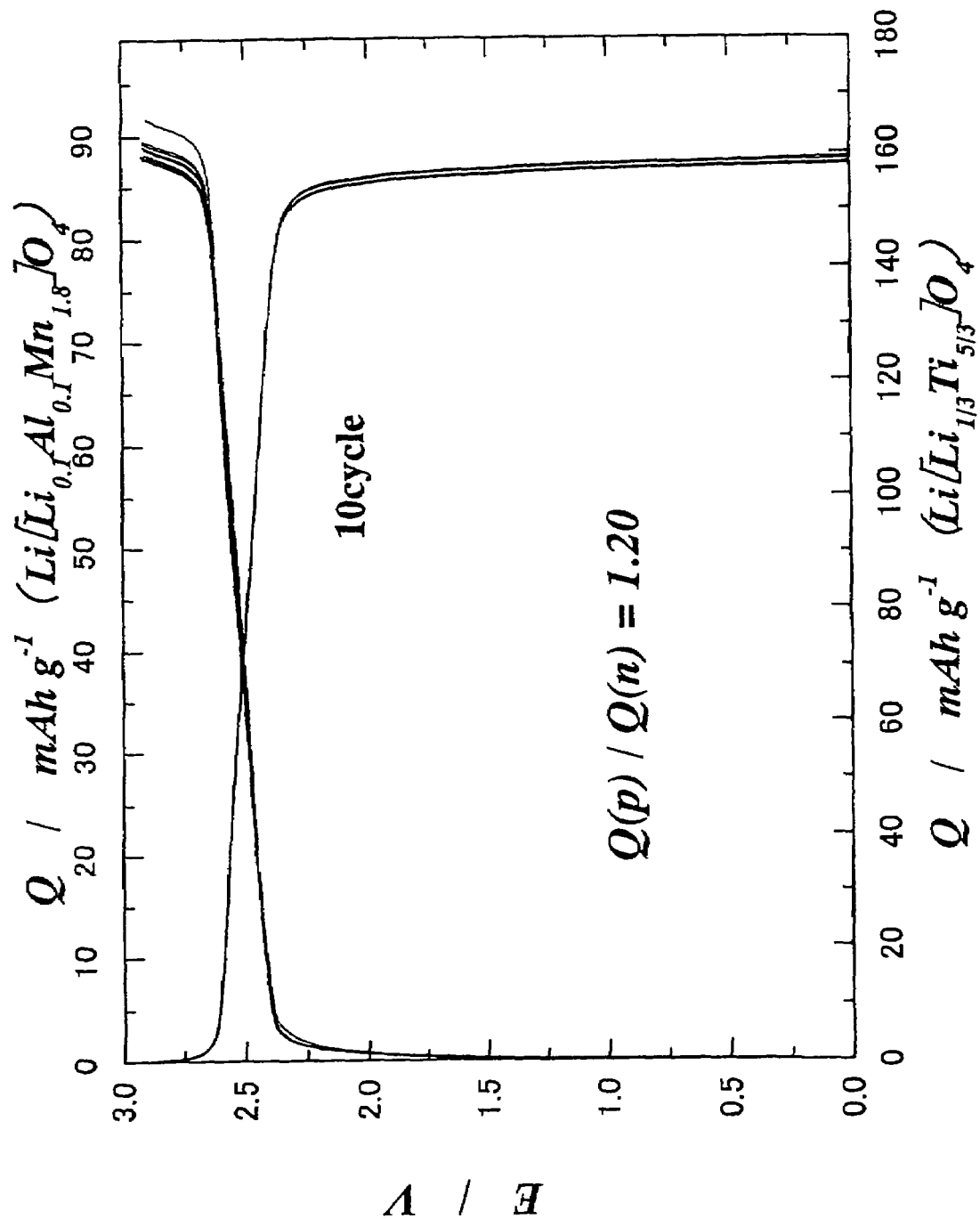
FIG. 1 is a graph showing charge and discharge behavior of a non-aqueous electrolyte secondary battery of the present invention.

The present invention relates to a non-aqueous electrolyte secondary battery comprising a unit cell including a positive electrode, a negative electrode, a separator disposed between the positive electrode and the negative electrode, and a non-aqueous electrolyte, wherein the positive electrode capacity is larger than the negative electrode capacity, and at least a portion of the nonaqueous electrolyte is gasified at the time of charging. In the following, an embodiment of the non-aqueous electrolyte secondary battery of the present invention is described with regard to each component and a manufacturing method therefor.

(1) Synthesis for the Negative Electrode Active Material and Negative Electrode Preparation Using the Negative Electrode Active Material For the negative electrode active material of the present invention, a lithium-containing titanium oxide is preferably used. Among the lithium-containing titanium oxides, $Li_{3+3x}Ti_{6-3x}O_{12}$ where $0 \leq x \leq 1/3$ is preferably used. For example, a lithium compound such as lithium carbonate ($Li_2CO_3$) or lithium hydroxide (LiOH) is mixed with titanium oxide ($TiO_2$) to form a desired composition, and the obtained mixture is heated in an oxidizing atmosphere such as in air or in oxygen airflow at a temperature of for example about 800° C. to about 1000° C, for easily synthesizing $Li_{3+3x}Ti_{6-3x}O_{12}$. The valence of Ti in $Li_4Ti_5O_{12}$ (where $x=1/3$ in $Li_{3+3x}Ti_{6-3x}O_{12}$) is four.

The lithium-containing titanium oxide suitably used for the negative electrode active material, $Li_{3+3x}Ti_{6-3x}O_{12}$ (023 $x \leq 1/3$), preferably comprises a mixture of a crystal particle having a particle size of for example about 0.1 µm to about 8 µm, and a secondary particle of the crystal particle having a particle size of about 2 µm to about 30 µm.

Additionally, when taking measures against overdischarge (reverse charging) by adsorbing Li at the negative electrode active material, the valence of Ti may be set to below four. To be specific, by satisfying $x<1/3$ in $Li_{3+3x}Ti_{6-3x}O_{12}$, $Li_{1.035}Ti_{1.965}O_4$ may be used.

Titanium oxide having the spinel structure, $Li_4Ti_5O_{12}$, is mounted on batteries currently on market, and even the high quality one can be purchased.

For the negative electrode, for example after sufficiently mixing 88 wt % of the negative electrode active material, 6 wt % of the acetylene black as the conductive material, 6 wt % of PVdF (polyvinylidene fluoride) as the binder, the mixture was diluted with NMP (N-methyl-2-pyrrolidone), and the obtained mixture is applied to an aluminum foil-made current collector (substrate). The current collector after the application of the mixture was dried for example at 100° C. for 30 minutes, and further dried immediately before use for example in vacuum at 85° C. for 14 hours, to obtain a plate or sheet negative electrode. The thickness of the negative electrode and the charging density may be changed appropriately according to the battery design (balance between the positive electrode capacity and the negative electrode capacity). For example, at the time of testing such as electrochemical measurement, the thickness can be set for example to about 0.3 mm to about 0.2 mm, and the electrode density may be set to for example about 1.0 g/cm$^3$ to about 2.0 g/cm$^3$. Additionally, when battery are to be evaluated, the thickness may be set to about 5 mm. The thin negative electrode with the thickness of below 1 mm may be used, but for securing battery capacity, the negative electrode with the thickness of 1 mm or more is used advantageously.

(2) Synthesis of Positive Electrode Active Material and Positive Electrode Preparation Using the Positive Electrode Active Material For the positive electrode active material of the present invention, various ones may be used: particularly, a lithium-containing manganese composite oxide having a spinel structure is preferably used.

When $Li[Li_xMn_{2-x}]O_4$ where $0 \leq x<0.33$ is to be prepared as the lithium-containing manganese composite oxide having a spinel structure, first, manganite (MnOOH) and lithium hydroxide (LiOH) are well mixed so that a desired composition is made, and the mixture is heated for example at about 500° C. to about 600° C. for 10 to 12 hours in air (primary calcination). At this time, if necessary, the obtained product (powder) may be pressed to form pellets, or the product (powder) may be made into grains. The positive electrode active material can be synthesized by further crushing thus obtained material heated by such a primary calcination, and by heating (secondary calcination) the obtained crushed product at for example about 700° C. to about 800° C. for about 10 to about 12 hours in air.

When $Li_{1+x}Mn_{2-x-y}A_yO_4$ where A is at least one selected from the group consisting of Al, Ni, and Fe, $0 \leq x \leq 0.3$, and $0 \leq y \leq 0.6$) is to be used as the positive electrode active material, aluminum hydroxide ($Al(OH)_3$), $Ni(OH)_2$, or FeOOH may be mixed into the mixture of manganite and lithium hydroxide mentioned above so that the desired composition is made. Conditions of the calcination afterwards may be set to the same as the above. However, when $Ni(OH)_2$ is to be used, since the increase in an amount of $Ni(OH)_2$ to be added makes the sufficient mixing of nickel and manganese at nano-level difficult, the calcination temperature is preferably increased so that sufficient dispersed condition is obtained. To be specific, the primary calcination temperature is preferably increased to about 900° C. to about 1100° C. The secondary calcination temperature is preferably decreased to about 600° C. to about 800° C., so that oxygen that tends to become deficient at the time of the calcination at high temperature is restored.

Further, for dispersing nickel and manganese at atomic-level, a composite hydroxide including nickel and manganese is preferably made and used as a raw material. For example, when $Li[Ni_{1/2}Mn_{3/2}]O_4$ is to be made, after a composite hydroxide (oxide) is made by for example coprecipitation so that the ratio of nickel to manganese becomes 1 to 3. The obtained composite oxide and lithium hydroxide are sufficiently mixed, and the obtained mixture is rapidly heated for example to about 1000° C. After the obtained mixture is allowed to stand at about 1000° C. for about 12 hours, the temperature is dropped to about 700° C., and the obtained mixture is allowed to hold at about 700° C. for 48 hours. Afterwards, the obtained mixture may be naturally cooled to ambient temperature.

$Li_{1+\alpha}[Me]O_2$ with a layered structure where Me is a transition metal including Ni and at least one selected from the group consisting of Mn, Fe, Co, Ti, and Cu, and $0 \leq \alpha \leq 0.2$ that is preferably used as the positive electrode active material may be synthesized by mixing an oxide, hydroxide, and/or carbonate, including an element forming the desired positive electrode active material, so that a predetermined composition is made, and calcinating the obtained mixture. For synthesizing the positive electrode active material including two or more kinds of transition metals dispersed in nano-level, a powder material that is fine as much as possible and a grinder mixer such as a ball mill are used for a sufficient mixing, and the obtained mixture is heated preferably.

Additionally, since nickel and manganese are particularly hard to be dispersed, it is effective to prepare a composite hydroxide (oxide) in advance by a method such as coprecipitation. For example, when $Li_{1+\alpha}[Ni_{1/2-z}Mn_{1/2-z}Co_{2z}]O_2$ where $0 \leq \alpha \leq 0.2$, and $z \leq 1/6$ is to be made, after sufficiently mixing a predetermined amount of lithium hydroxide and a predetermined amount of $[Ni_{1/2-z}Mn_{1/2-z}Co_{2z}(OH)]_2$ which is made by coprecipitation, the obtained mixture is molded into pellets and heated. The calcination temperature at this time is preferably about 900° C. to about 1100° C. Other techniques in detail for such case are disclosed in the above-mentioned Japanese Laid-Open Patent Publication No. 2003-323893 and Japanese Laid-Open Patent Publication No. 2005-142047.

The positive electrode may be made in the same manner as the above negative electrode. For example, 88 wt % of a positive electrode active material, 6 wt % of acetylene black as the conductive material, and 6 wt % of PVdF (polyvinylidene fluoride) as the binder are sufficiently mixed, and then the mixture is diluted with NMP (N-methyl-2-pyrrolidone). The obtained mixture is applied on an aluminum foil-made current collector. The current collector with the mixture applied was dried for example at 100° C. for 30 minutes, and then further dried right before use in vacuum for example at 85° C. for 14 hours to obtain a plate-like or a sheet-like positive electrode. The thickness and the charging density of the positive electrode may be changed according to the battery design (balance between the positive electrode capacity and the negative electrode capacity). For example, at the time of testing such as electrochemical measurement, the thickness is set to for example about 0.3 mm to about 0.2 mm, and the electrode density is set to for example about 1.0 g/cm$^3$ to about 2.0 g/cm$^3$. Also, when a battery test is evaluated, the thickness may be set to a thickness of about 5 mm. A thin positive electrode of 1 mm or less may be used as well, but for securing the battery capacity, it is advantageous to use the negative electrode of 1 mm or more.

In the present invention, the positive electrode capacity is characteristically greater than the negative electrode capacity. That is, in the non-aqueous electrolyte secondary battery of the present invention, positive electrode capacity Q (p) and negative electrode capacity Q (n) satisfy the relation, Q (p)/Q (n)>1. The combination of the positive electrode and the negative electrode satisfying such a relation may be appropriately selected by those in the art.

The "capacity" in the above refers to "theoretical capacity".

In the present invention, the "capacity" can be determined as in below, though the combinations of materials may change the capacity slightly. In the positive electrode, the capacity refers to the charge and discharge reversible capacity in the range of a potential of 2 V to 4.5 V relative to lithium metal. In the negative electrode, similarly, the capacity refers to the charge and discharge reversible capacity in the range of a potential of 1.0 V to 2.0 V relative to lithium metal.

(3) Non-Aqueous Electrolyte

The non-aqueous electrolyte of the present invention is characterized in that at least a portion of the electrolyte decomposes upon charging the non-aqueous electrolyte secondary battery. The non-aqueous electrolyte including a component that gasifies upon charging, especially upon full charge will suffice. However, a non-aqueous electrolyte appropriate for the positive and negative electrode active materials needs to be selected. The positive and negative electrode active materials insert and extract lithium at respective charge-discharge potentials thereof. Since such absorbing and desorbing reactions substantiate a battery, an occurrence of a side reaction, i.e., the non-aqueous electrolyte being gasified in a range that may hinder such absorbing and desorbing reactions, may cause a failure in the battery substantiation. Therefore, the non-aqueous electrolyte of the present invention needs to be formed so that at least a portion of the non-aqueous electrolyte is gasified by a further charging after the battery is fully charged.

This is similar to a phenomenon in which oxygen is generated in the aqueous solution from the positive electrode by overcharging. A specific example is given for easier understanding. Assumed here is a case in which Li[Li$_{0.1}$A$_{10.1}$Mn$_{1.8}$]O$_4$, i.e., a manganese oxide having a spinel structure, is used as the positive electrode, and Li$_4$Ti$_5$O$_{12}$ is used as the negative electrode active material. Regarding the balance between the positive electrode capacity and the negative electrode capacity, it is assumed that the positive electrode and the negative electrode made as described above are used by setting the positive electrode capacity so that the positive electrode capacity is 1.2 times the negative electrode capacity. This is so-called a negative electrode capacity regulated non-aqueous electrolyte secondary battery. The thickness and density of the positive electrode and the negative electrode are, for electrochemical measurement, about 0.3 mm to about 0.2 mm and about 1.0 g/cm$^3$ to about 2.0 g/cm$^3$ respectively. For the positive and negative electrode current collectors, an aluminum foil is used, and for the non-aqueous electrolyte, an electrolyte obtained by dissolving 1 mol/liter of LiBF$_4$ in an acetonitrile solvent is used. Further, for the separator, a polyethylene (PE)-made microporous film is used.

When a non-aqueous electrolyte secondary battery of such form is charged, the charging can be carried out up to the negative electrode capacity. That is, a charging up to 3 V will make the battery fully charged. However, since the positive electrode has a charge and discharge potential of 4 V relative to lithium, and the negative electrode has a charge and discharge potential of 1.5 V relative to lithium, the average battery voltage is 2.5 V. A voltage of more than 2.5 V decreases the potential of a small-capacity negative electrode. When the negative electrode potential is decreased to the acetonitrile decomposition potential, acetonitrile is decomposed to gasify. Methane gas is mainly generated at this time. Additionally, since the charge and discharge potential of the negative electrode is 1.5 V, decomposition of acetonitrile by reduction at a potential lower than 1.5 V is necessary. Since the aluminum foil used for the current collector adsorbs lithium at about 0.3 V, when this current collector is used, a solvent that is reduced in the range of 1.5 V to 0.3 V to generate gas has to be used. Acetonitrile satisfies this condition fully.

The gas generated by decomposition of at least a portion of the non-aqueous electrolyte as in the above may be released to outside the battery via a gas-releasing valve generally provided in a non-aqueous electrolyte secondary battery. Since heat is released by such a gas-releasing valve, the heating problem as in the conventional redox shuttle can be avoided.

The above gas-releasing valve may be resettable (a reset type). The valve preferably has a structure that enables refilling the electrolyte decreased by the acetonitrile gasification.

The aluminum foil current collector is used from the following reasons. When the above non-aqueous electrolyte secondary battery is discharged till 0 V, since the negative electrode capacity is regulated, the negative electrode potential increases to the proximity of 4 V. When a generally used current collector of copper is used, copper is dissolved and as a result, there is a possibility of generating an internal short-circuit. Therefore, it is significant to use a current collector comprising aluminum foil.

When graphite is used as the negative electrode active material, the acetonitrile decomposition occurs before charge and discharge reaction of graphite and the battery capacity cannot be obtained. For those that function similar to acetonitrile, for example, methyl acetate, methyl butyrate, and γ-butyrolactone may be mentioned.

As described above, the non-aqueous electrolyte secondary battery of the present invention can be achieved by optimally selecting and combining a positive electrode active material, a negative electrode active material, a capacity balance design, a non-aqueous electrolyte that decomposes in an appropriate potential range, and a current collector material. The above described is not to limit the present invention, and various combinations can be selected to the extent that the effect of the present invention is obtained. Although the reduction side was used in the above, the oxidation side may be used as well.

Although the present invention was described in the above only in view of the overcharge protection from gas generation, in the present invention, the overdischarge (reverse charging) protection is possible as well. For example, in the above-described embodiment, by changing the following two points, a non-aqueous electrolyte secondary battery that can achieve protection for both overcharge and overdischarge can be realized.

First point is to change the composition of titanium oxide used for the negative electrode. To be specific, $Li_{3+3x}Ti_{6-3x}O_{12}$ ($x<1/3$) is used. Second point is to set Q(p)/Q(n) to approximately 1.0 while regulating the negative electrode capacity, although in the above embodiment, the positive electrode capacity is set so that the positive electrode capacity is 1.2 times the negative electrode capacity (Q(p)/Q(n)=1.2). Based on these two points, as mentioned above, the protection for overdischarge (reverse charging) is possible. That is, lithium can be released from the negative electrode at the time of overdischarge (reverse charging), which enables the protection for overdischarge (reverse charging).

Acetonitrile is a solvent with a high dielectric constant and a high conductivity, thus is suitable for use that necessitates a high-rate discharge and a high-output pulse. Lead-acid batteries are frequently used for the field that necessitates a high-rate discharge and a high output pulse. In view of this, the non-aqueous electrolyte secondary battery of the present invention is a suitable technique for replacing lead-acid batteries. In the present invention, the non-aqueous electrolyte is used in excess, and by gasifying at least a portion thereof, the balance of the capacity between cells is kept.

In addition to acetonitrile, for example, a dinitrile compound such as succinonitrile, glutaronitrile, or adiponitrile may be added as well. Since these dinitrile compounds have a higher viscosity than acetonitrile, the dinitrile compounds tend to be present at the liquid level and reliably curb releasing of a mononitrile compound with a low viscosity as a splash at the time of gas generation from the gas-releasing valve along with the gas. That is, these dinitrile compounds function as a preventive agent for the splash of acetonitrile at the liquid level.

(4) Metal Electrode

As described above, when at least a portion of the non-aqueous electrolyte is decomposed to generate gas, the decomposition at the entire surface of the electrode that charges and discharges (especially negative electrode) may gradually deteriorate the electrode. Thus, the non-aqueous electrolyte secondary battery of the present invention preferably includes a metal electrode for the gas generation.

For the metal electrode material, although it depends on the kinds of the non-aqueous electrolyte, for example, nickel, copper, iron, or stainless steel are preferably used in view of the fact that the catalyst function can be expected. This catalyst function enables a selective gas generation on the metal electrode.

By providing such a metal electrode, the gas generation at the entire surface of the charging and discharging electrode (especially the negative electrode) can be curbed, and the deterioration of the electrode can be curbed. To be specific, for example, in the above embodiment (3), at the time of overcharge, since the potential in the proximity of the current collecting lead provided at the negative electrode lowers in the earliest, the metal electrode is preferably set in the proximity of the current collecting lead. The size of the metal electrode may be selected appropriately, to the extent that the effect of the present invention and the original functions of the non-aqueous electrolyte secondary battery are not deteriorated.

(5) Battery Pack or Battery Module and its Charging Control

The non-aqueous electrolyte secondary battery of the present invention may also be applied to a battery pack or a battery module including a plurality of the unit cells mentioned above connected in series, though in the above (1) to (4), a non-aqueous electrolyte secondary battery including a unit cell was described. Unit cells connected in parallel may be included as well, as the case may be.

A battery pack or a battery module of the present invention is described by using a unit cell having the structure of the above (3). In the above (3), $Li[Li_{0.1}Al_{0.1}Mn_{1.8}]O_4$ was used for the positive electrode, $Li_4Ti_5O_{12}$ was used for the negative electrode, and an electrolyte in which 1 mol/liter $LiBF_4$ was dissolved in an acetonitrile solvent was used for the non-aqueous electrolyte. Also, the negative electrode capacity was smaller than the positive electrode capacity, and the negative electrode capacity was regulated.

A battery pack obtained by connecting five unit cells as in the above in series is described. The both ends of this battery pack are charged with a voltage of 15 V. Even if there is an unavoidable variation in the capacity generated during the manufacturing process between the five unit cells connected in series and the unit cell with the smallest capacity is overcharged, a rapid voltage increase of that unit cell does not occur based on the gas generation by the acetonitrile decomposition, and other unit cells are also charged sufficiently. However, when such a gas generation mechanism does not work, the unit cell with the lowest capacity rapidly increases its voltage but the 15 V of the both ends does not change, and the charging ends without fully charging the other unit cells.

In short, all of the unit cells connected in series are charged to the same degree with the unit cell having the lowest capacity. Further, the overcharged unit cell is greatly damaged, and cycle life declines greatly. So far, to prevent such a problem arose from capacity variation, the charging was controlled in each unit cell in a non-aqueous electrolyte secondary battery without Neumann mechanism. In such a case, the voltage of each unit cell is 3 V.

As described above, the present invention exhibits notable effects in a battery pack or a battery module including a unit cell group obtained by connecting a plurality of unit cells in series. That is, while a great saving on wiring and charge control costs can be expected, deterioration of a battery pack or a battery module can be expected to be kept to the minimum even in case of an error in the control.

Thus, the present invention also provides a method for controlling a battery pack or a battery module, the battery pack or the battery module comprising a unit cell group comprising a plurality of unit cells connected in series;

the unit cell including a positive electrode, a negative electrode, a separator disposed between the positive electrode and the negative electrode, and a non-aqueous electrolyte;

a positive electrode capacity is greater than a negative electrode capacity;

at least a portion of the non-aqueous electrolyte gasify while being charged; and at least two of the above unit cells are controlled for charge and discharge as one unit.

(5) Other Components

For components of the non-aqueous electrolyte secondary battery of the present invention other than those mentioned above, known ones in the art may be used. For example, for the separator, in addition to the conventionally used polyolefin microporous film, a nonwoven fabric may be used as well. Since the nonwoven fabric is highly liquid-retainable, it can be effectively used to drastically improve rate performance, especially pulse performance. Also, since there is no advance and complex manufacturing steps like those of porous film necessary, separator material can be selected from a wide range with less cost.

In view of its use in the non-aqueous electrolyte secondary battery of the present invention, the separator material is preferably polyethylene, polypropylene, polybutylene terephthalate, or a mixture of these materials. Polyethylene and polypropylene are stable for an electrolyte, and when strength under high temperature is needed, polybutylene terephthalate is preferable.

The fiber diameter of the fiber forming the separator is preferably about 1 μm to about 3 μm, and those fibers that went through a calender roll process to partially fuse fibers together are effective for thinner and stronger separator.

The container used for manufacturing a battery pack or a battery module may be formed for example with a metal such as aluminum. For a container having a complex structure such as the one including inner partitions, a resin-made container can be used. In this case, an aluminum foil is preferably attached to the container outer wall to curb incoming water.

For a lithium salt included in the above non-aqueous electrolyte (i.e., lithium salt to be dissolved in the solvent), conventionally known ones may be used. For example, imides such as $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroboran lithium, lithium tetraphenylboronate, $LiN(CF_3SO_2)(C_2F_5SO_2)$, $LiN(CF_3SO_2)_2$, $LiN(C_2F_5SO_2)_2$, and $LiN(CF_3SO_2)(C_4F_9SO_2)$ may be mentioned. LiF or LiCl also may be mentioned as well. These may be used singly, or may be arbitrary combined to the extent that would not give an adverse effect to the effect of the present invention. Among them, when acetonitrile or γ-butyrolactone is used as a solvent, $LiBF_4$ is preferable.

In the following, the present invention is described with reference to Examples. But the present invention is not limited to these Examples.

EXAMPLE 1

Examples were carried out based on the specific example given above (3). That is, in this Example, a non-aqueous electrolyte secondary battery of the present invention including the following components was made.

Positive electrode active material: $Li[Li_{0.1}Al_{0.1}Mn_{1.8}]O_4$
Negative electrode active material: $Li_4Ti_5O_{12}$
Non-aqueous electrolyte: electrolyte in which 1 mol/liter $LiBF_4$ was dissolved in acetonitrile
Separator: Calgard #2500 manufactured by Celgard LLC The positive electrode capacity was set so that the positive electrode capacity becomes greater than the negative electrode capacity, and the negative electrode capacity was regulated.

For the positive electrode active material, manganite (MnOOH), aluminum hydroxide ($Al(OH)_3$), and lithium hydroxide (LiOH) were mixed well to make a desired composition, and the obtained mixture was pressed to prepare pellets. The obtained pellets were heated at 550° C. for 10 to 12 hours in air (primary calcination). A positive electrode active material was synthesized by crushing the pellets after the primary calcination and heating the crushed product at 750° C. for 10 to 12 hours in air (secondary calcination).

On the other hand, for the negative electrode active material, lithium carbonate ($Li_2CO_3$) and titanium oxide ($TiO_2$) were mixed to make a desired composition, and the obtained mixture was heated in air at 900° C. for 12 hours to obtain $Li_4Ti_5O_{12}$.

A positive electrode and a negative electrode were made as in below by using the above positive electrode active material and the above negative electrode active material. The following were mixed sufficiently: 88 wt % of the positive electrode active material or the negative electrode active material, 6 wt % of acetylene black as a conductive material, and 6 wt % of PVDF (polyvinylidene fluoride) as a binder. The mixture was diluted with NMP (N-methyl-2-pyrrolidone), and the obtained mixture was applied on an aluminum foil-made current collector. The current collector with the mixture applied was dried at 100° C. for 30 minutes, and then further dried in vacuum right before use at 85° C. for 14 hours, to obtain a positive electrode or a negative electrode. The positive electrode thickness and the negative electrode thickness were 0.287 mm and 0.207 mm, respectively, and the positive electrode density and the negative electrode density were 1.88 $g/cm^3$ and 1.44 $g/cm^3$, respectively. The ratio of the positive electrode capacity to the negative electrode capacity, (Q(p)/Q(n)), was set to 1.20, and an electrochemical test cell (non-aqueous electrolyte secondary battery) comprising a unit cell with its battery capacity regulated by the negative electrode capacity was made.

Figure 11:
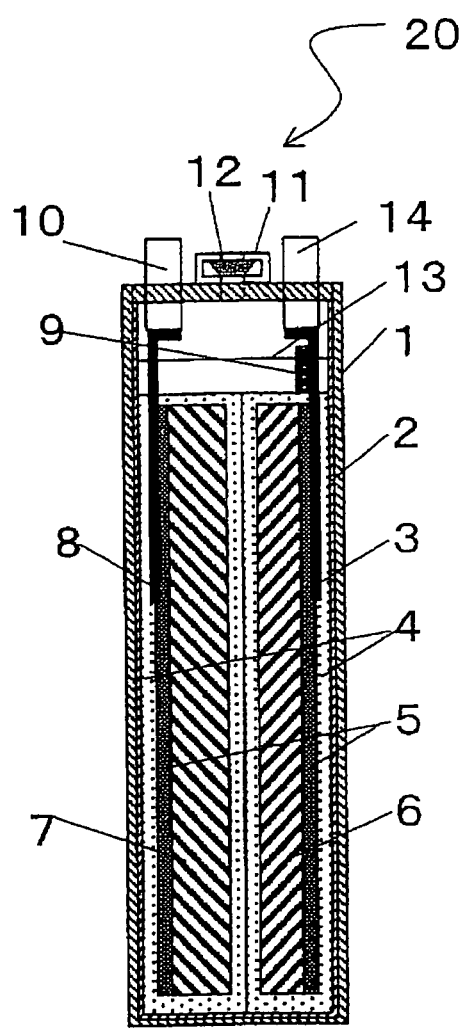
FIG. 11 is a schematic vertical cross section of a unit cell (non-aqueous electrolyte secondary battery, a cell for electrochemical test) made in Examples of the present invention.

FIG. 11 shows a schematic vertical cross section illustrating the structure of a unit cell 20 made in this Example. The unit cell includes a resin-made container 1, an aluminum-made laminate film 2, a negative electrode current collecting lead 3, a separator 4, an aluminum foil-made current collector 5, a negative electrode 6, a positive electrode 7, a positive electrode current collecting lead 8, a metal electrode 9, a negative electrode pole 10, a gas-releasing valve 11, a rubber valve 12, and a positive electrode pole 14. Reference numeral 13 shows a liquid level of the non-aqueous electrolyte (electrolyte).

Charge and discharge behavior of the thus made electrochemical test cell was determined. FIG. 1 shows charge and discharge behavior up to 10 cycles. In charge and discharge test, charge and discharge with a constant current were carried out in a charge and discharge range of 0 V to 2.9 V, and a current density of 0.33 $mA/cm^2$. The electrode area where the positive electrode and the negative electrode face each other was 3 $cm^2$. FIG. 1 shows a charge and discharge curve and a cycle life excellent in the range of 0 V to 2.9 V.

Figure 2:
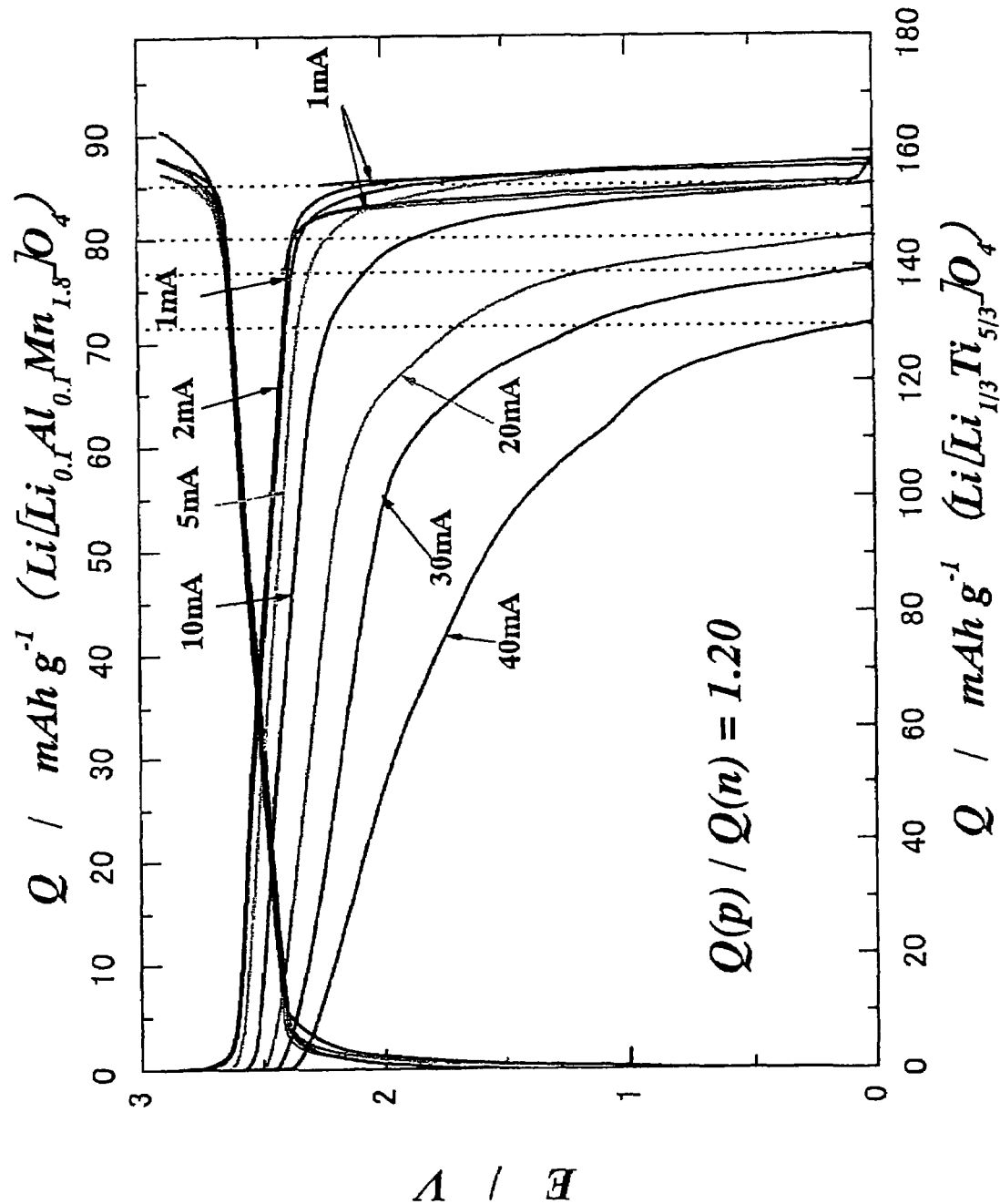
FIG. 2 is a graph showing discharge performance under high load of a non-aqueous electrolyte secondary battery of the present invention.

Next, a test for evaluating load performance was carried out by using the electrochemical test cell after 10 cycles. The results are shown in FIG. 2. Upon discharging, the discharge current was gradually increased from 1 mA to 40 mA, as shown in FIG. 2. After discharging till 0 V to discharge the remaining capacity, the cell was allowed to stand for 6 hours, and then discharged till 0 V with 1 mA. After thus substantially safely allowed the cell to be in discharged state, the cell was charged as a next cycle. As is clear from FIG. 2, this electrochemical test cell shows excellent load performance with the use of acetonitrile. Additionally, even after repetitive deep discharge to 0 V, almost no decline in the capacity is observed.

EXAMPLES 2 to 4

In these Examples, the balance between the positive electrode capacity and the negative electrode capacity was examined.

In a battery as in Example 1, the battery capacity is preferably regulated by the negative electrode capacity. This is because by broadening the negative electrode potential range, the positive electrode active material and the negative electrode active material are not deteriorated easily than by broadening the positive electrode potential range, in not only the overcharge range but also usual charge and discharge range. Also, as a method for improving stability of a spinel manganese material used in the positive electrode in a high potential range, lithium in simple $LiMn_2O_4$ may be increased excessively, and Al may be added. To confirm such an idea, an electrochemical test cell with its battery capacity regulated by the positive electrode capacity was made to carry out a charge and discharge test.

Figure 3:
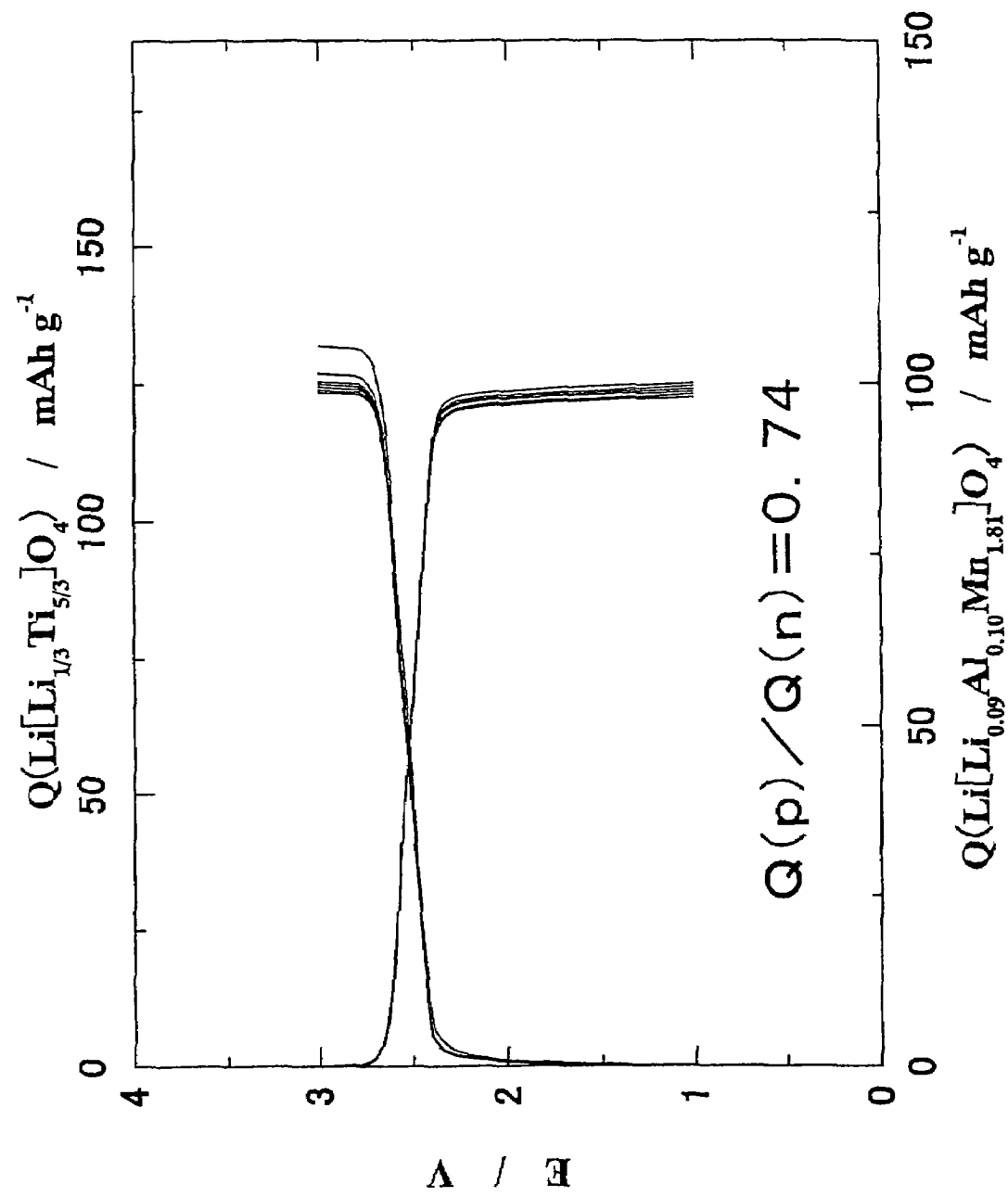
FIG. 3 is a graph showing charge and discharge behavior under positive electrode capacity regulation.
Figure 4:
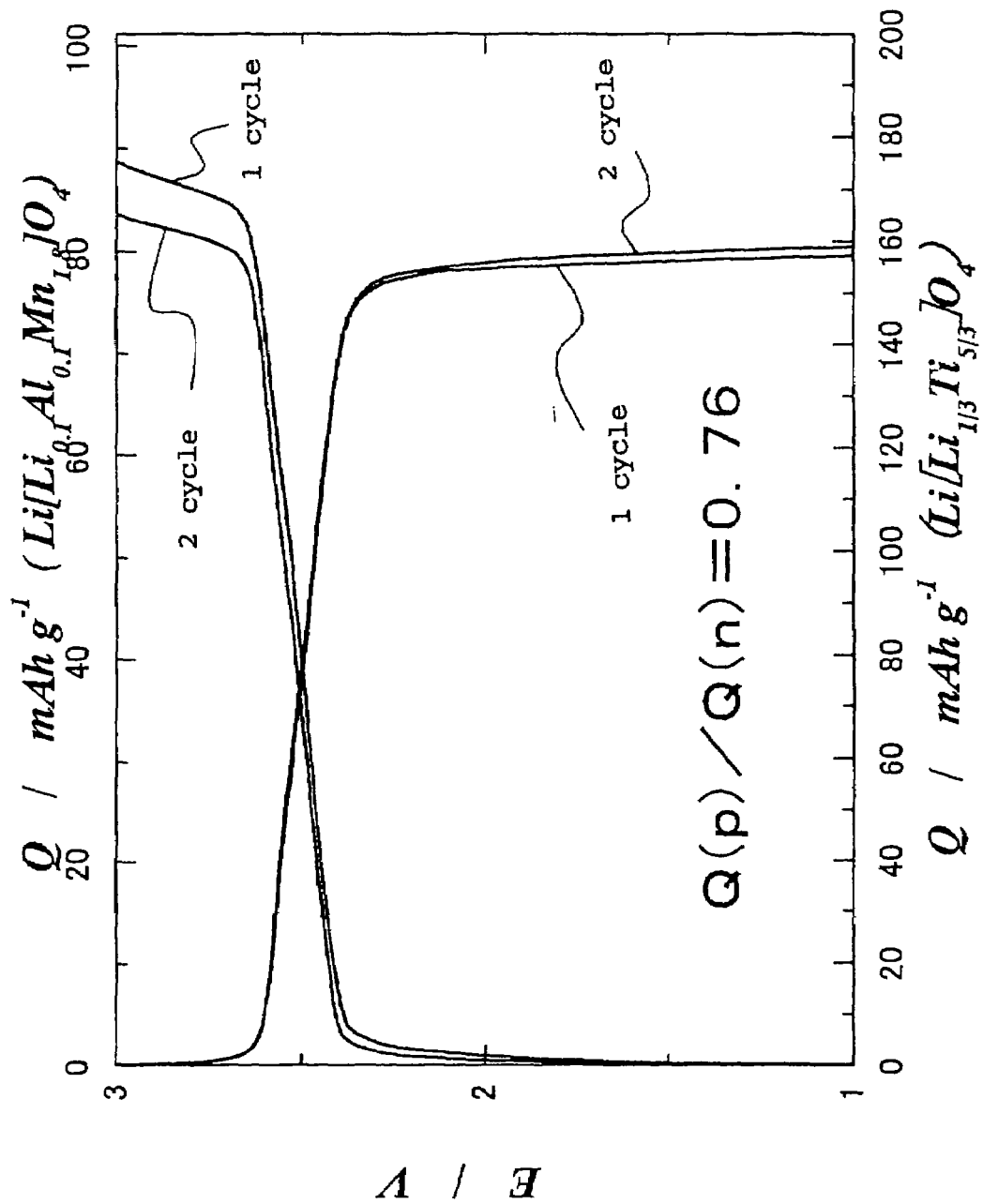
FIG. 4 is another graph showing charge and discharge behavior under positive electrode capacity regulation.
Figure 5:
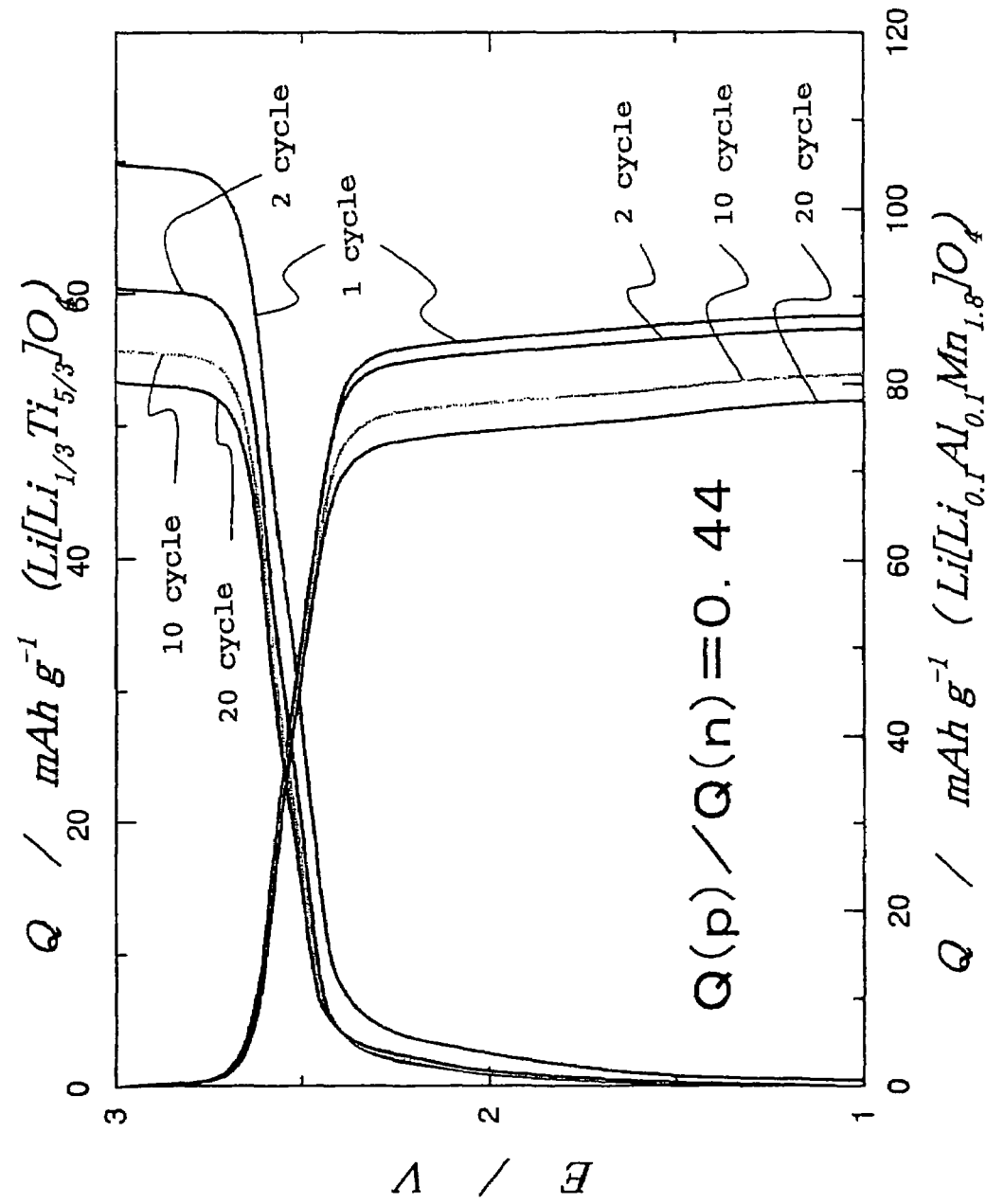
FIG. 5 is still another graph showing charge and discharge behavior of positive electrode capacity regulation.

The results are shown in FIGS. 3 to 5. In Examples 2 to 4, an electrochemical test cell was made and a charge and discharge test was carried out in the same manner as Example 1, except that Q (p)/Q (n), a charge and discharge range, and a current value per 1 g of the positive electrode active material were set as shown in Table 1. Test was conducted with conditions as mentioned in the above, since a test with a low rate till 0 V can achieve evaluation of the stability of the positive electrode at a high potential range with further better sensitivity.

TABLE 1

| | Q (p)/Q (n) | Charge and Discharge Range (V) | Current Value per 1 g of Positive Electrode Active Material (mA/g) |
|---|---|---|---|
| Ex. 2 (FIG. 3) | 0.74 | 1 to 3 | 21.8 |
| Ex. 3 (FIG. 4) | 0.76 | 0 to 3 | 7.6 |
| Ex. 4 (FIG. 5) | 0.44 | 0 to 3 | 10.0 |

As is clear from FIGS. 3 to 4, under the conditions of Example 2, charge and discharge advance with almost no problem. Under harsh conditions of Example 4, positive electrode deterioration is observed. Since in the same test with the use of $LiMn_2O_4$, deterioration is observed under the conditions of FIG. 3, it is clear that the use of $Li[Li_{0.1}Al_{0.1}Mn_{1.8}]O_4$ contributes to the improvement. Also, even with the use of $Li[Li_{0.1}Al_{0.1}Mn_{1.8}]O_4$, when a battery is regulated by the positive electrode capacity, it is preferable that the positive electrode capacity (Q (p))/the negative electrode capacity (Q (n)) is greater than 0.44.

COMPARATIVE EXAMPLE 1

Figure 6:
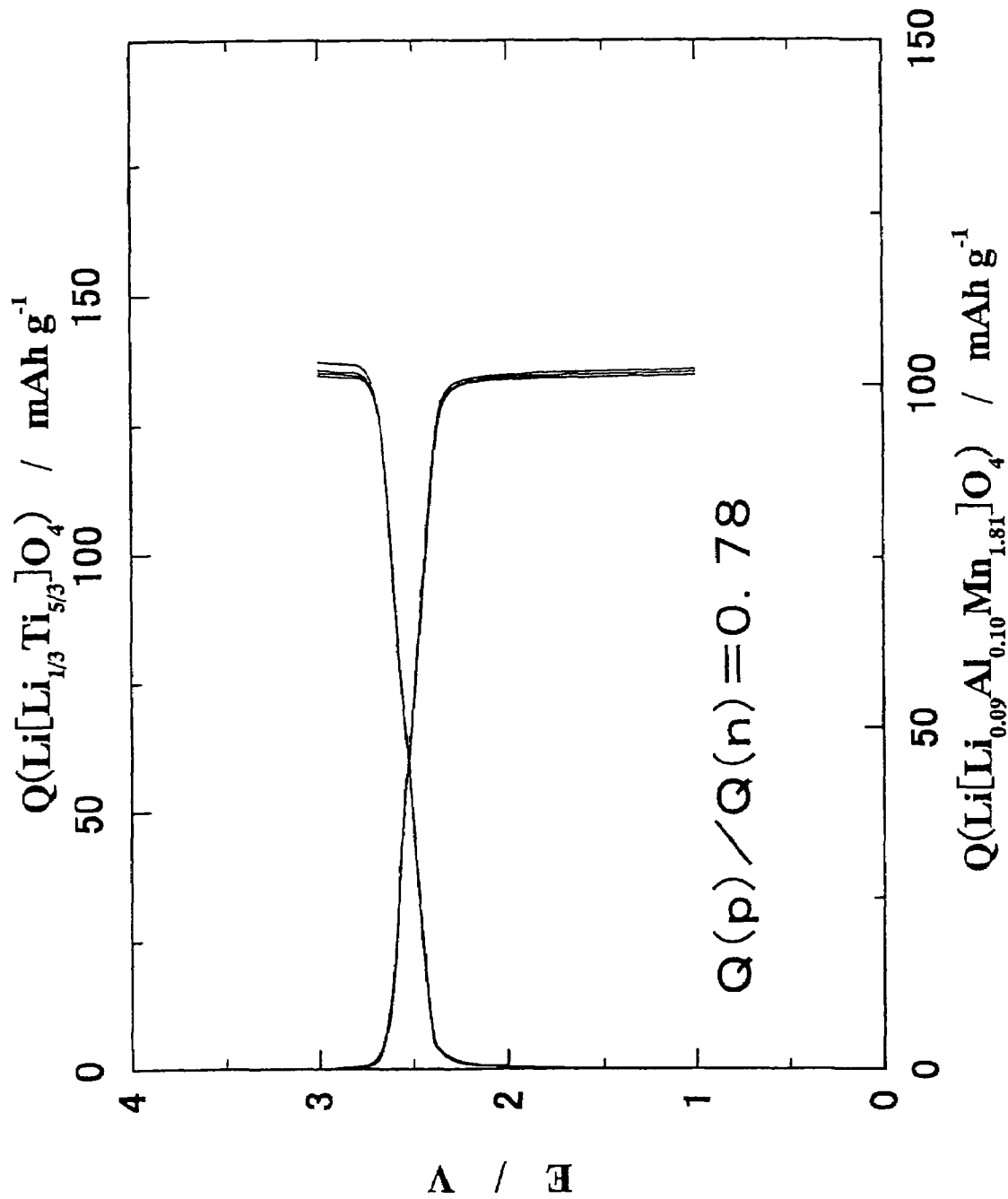
FIG. 6 is a graph showing charge and discharge behavior in Comparative Example using EC/DMC type electrolyte.

In this Example, the advantage of the acetonitrile usage as a solvent in view of high load performance was examined. FIG. 6 shows a charge and discharge behavior of a battery made in the same manner as Example 2 (FIG. 3) except that as the non-aqueous electrolyte, an electrolyte in which 1 mol/liter $LiPF_6$ was dissolved in a solvent mixture of ethylene carbonate (EC) and dimethyl carbonate (DMC) (EC/DMC=3/7; volume ratio) was used.

Q (p)/Q (n) was 0.78, the charge and discharge current was 0.33 mA/cm², and the charge and discharge range was 1 V to 3 V. FIG. 6 shows that charge and discharge advance without problem even with the usage of this electrolyte.

Figure 7:
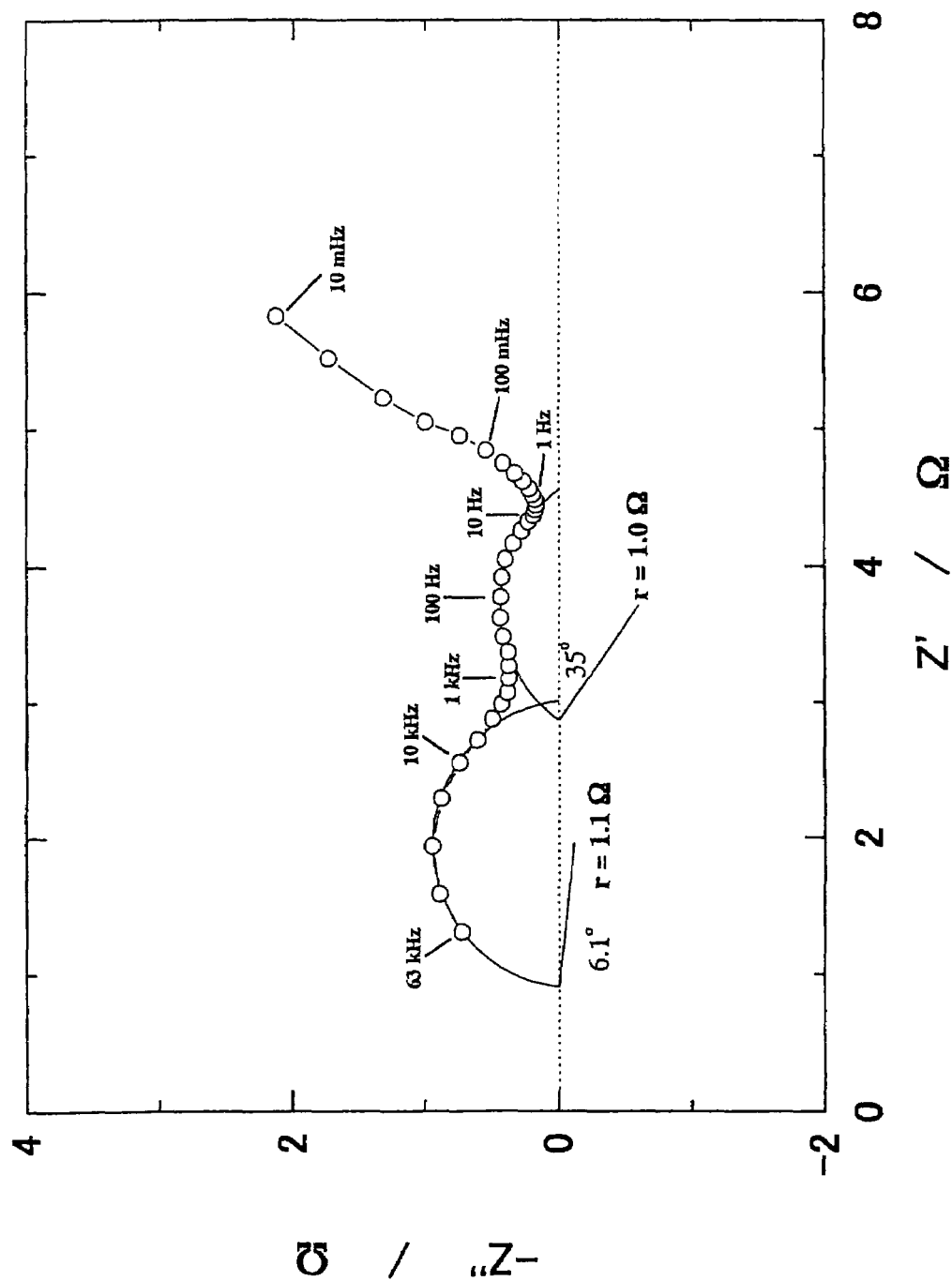
FIG. 7 is a graph showing the results of impedance measurement in the present invention using AN type electrolyte.
Figure 8:
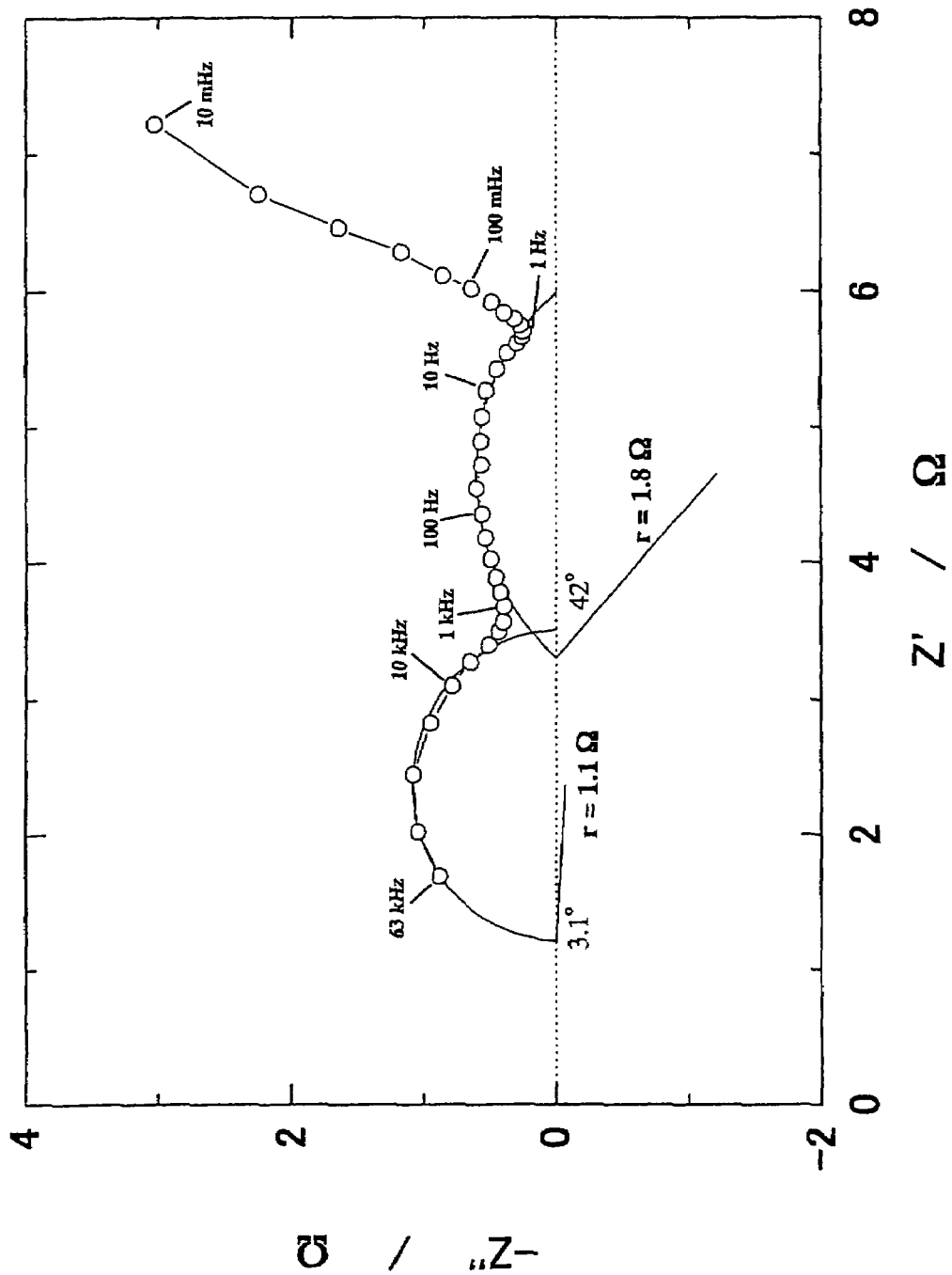
FIG. 8 is a graph showing the results of impedance measurement by using EC/DMC type electrolyte.

The impedance of the electrochemical test cell made in this Example was measured as well. FIG. 7 and FIG. 8 show the results. FIG. 7 shows the results of the impedance measurement for the battery in Example 2, and FIG. 8 shows the results of the impedance measurement for the battery in this Example. That is, FIG. 7 shows the results of the acetonitrile-type electrolyte usage, and FIG. 8 shows the results of EC/DMC-type electrolyte usage. Each battery was charged to almost 50%, and the voltage was around 2.52 V. Comparison between FIGS. 7 and 8 makes clear that the impedance is low when the acetonitrile-type electrolyte was used. Thus, the usage of acetonitrile as the solvent is advantageous for high load performance.

EXAMPLE 5

Figure 9:
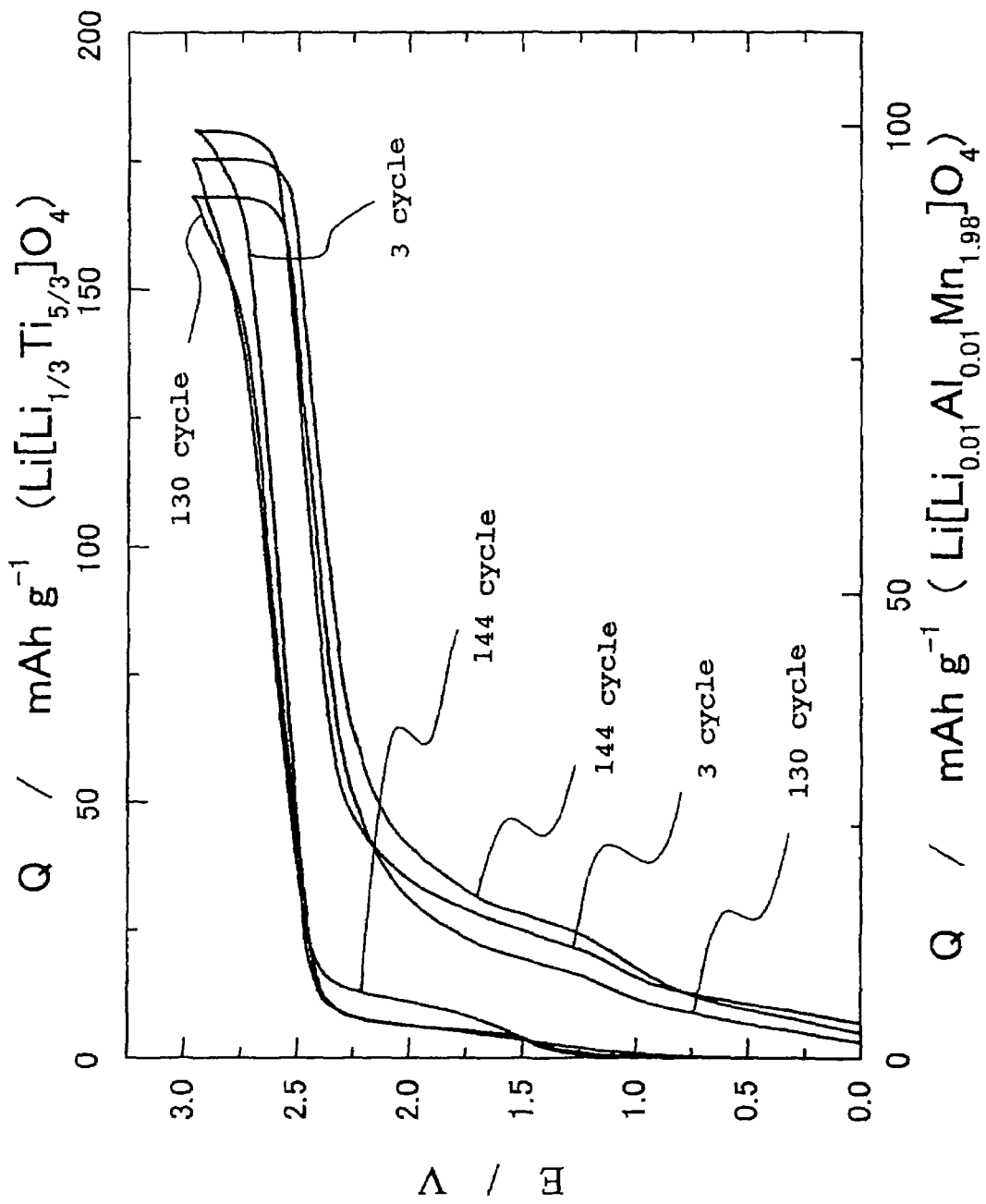
FIG. 9 is a graph showing charge and discharge behavior of the present invention using AN/GBL type electrolyte.
Figure 10:
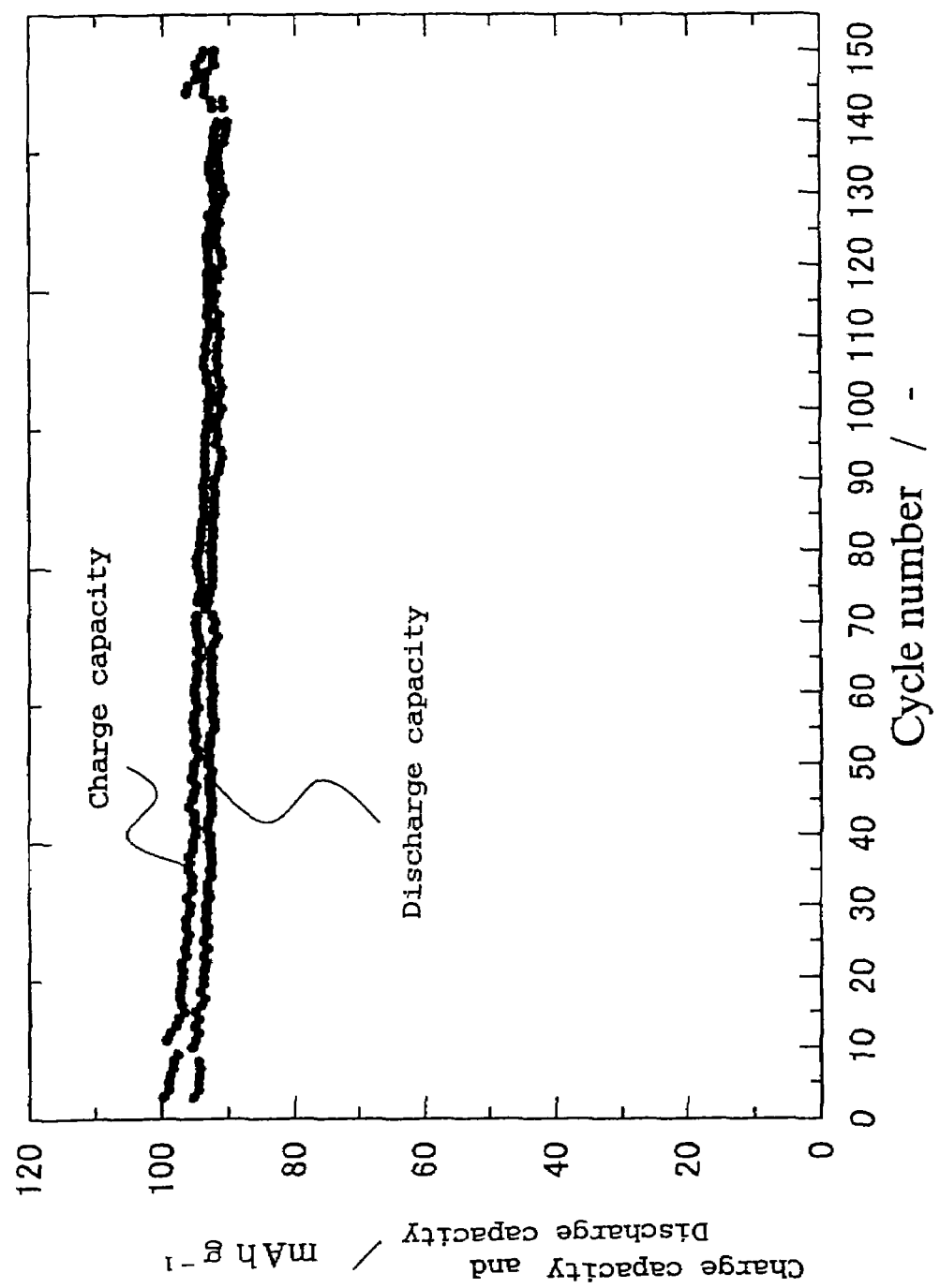
FIG. 10 is a graph showing cycle life of the present invention using AN/GBL type electrolyte.

In this Example, an electrochemical test cell was made in the same manner as Example 1, except that as the non-aqueous electrolyte, an electrolyte in which 0.5 mol/liter $LiClO_4$ was dissolved in a solvent mixture of γ-butyrolactone (GBL) and acetonitrile (AN) (GBL/AN=1/1; volume ratio) was used. This battery was the battery with its battery capacity regulated by the positive electrode capacity, the charge and discharge current was 0.5 mA/cm², and the charge and discharge range was 0 V to 3 V. FIG. 9 shows a charge and discharge curve, and FIG. 10 shows a cycle life. FIGS. 9 and 10 show some polarizations, but considering the salt concentration of 0.5 mol/liter, the results are excellent. No significant capacity decline is observed till 150th cycle.

EXAMPLE 6 AND COMPARATIVE EXAMPLE 2

In this Example, a battery module was made by connecting five unit cells made in Example 1 in series, and an evaluative test was carried out.

Figure 12:
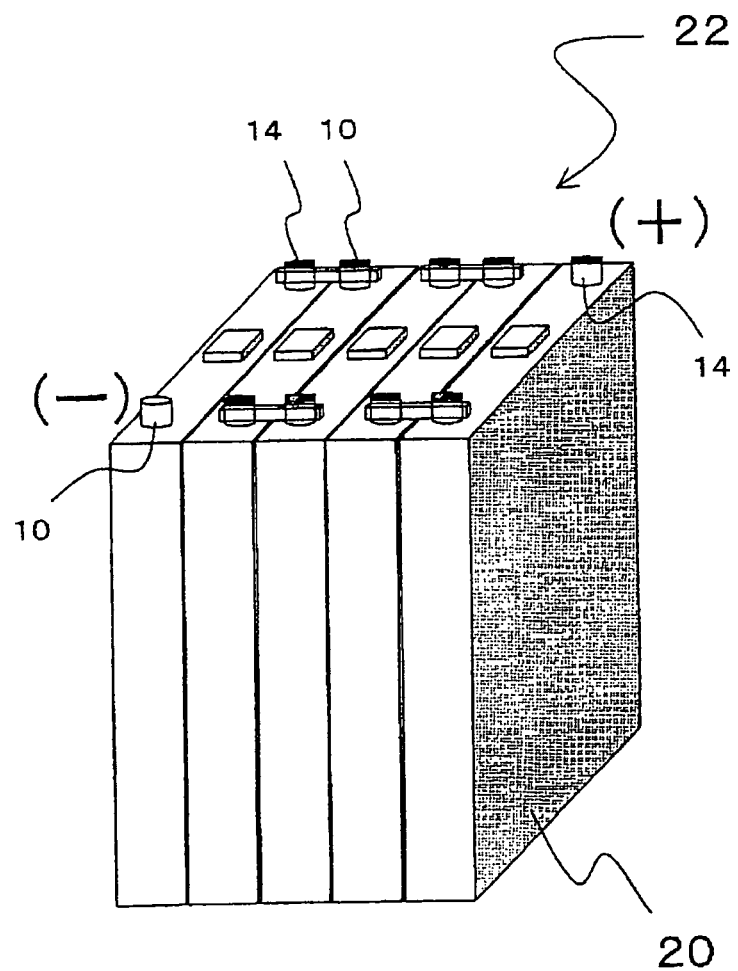
FIG. 12 is a schematic perspective view of a battery module comprising a group of unit cells in which five unit cells 20 of FIG. 11 are connected in series.

FIG. 12 shows a schematic perspective view of a battery module 22 made in this Example. Since five unit cells 20 made in Example 1 were used, the battery module 22 was regulated by the negative electrode capacity. The electric capacities of the five unit cells 20 used (the charge and discharge reversible capacity of the negative electrode) were set in advance so that there are variations in the capacities. To be specific, when the electric capacity of the base unit cell was set to 100, electric capacities of the other four unit cells were set to 95, 90, 105, and 110. Since the negative electrode weight determines the battery capacity, the setting was based on the negative electrode weight.

Therefore, Q (p)/Q (n) of the five unit cells were not the same strictly, they were all around 1.2. In Comparative Example 2, a battery module was made by using five unit cells made in Comparative Example 1, and an evaluative test was conducted in the same manner.

The charging was controlled by setting the both ends of the battery module to the charging voltage of 15 V. The discharge capacity of the 4th cycle after 3 cycles of charge and discharge at a constant current of 2 mA in the range of the battery module voltage of 0 V to 15 V is shown in Table 2.

TABLE 2

| | Non-aqueous electrolyte | Capacity(mWh) |
|---|---|---|
| Example 6 | 1MLiBF₄ + Acetonitrile | 188 |
| Comparative Example 2 | 1MLiPF₆ + (EC/DMC) | 153 |

Table 2 shows an obvious difference between the capacity in Comparative Example 2 and the capacity in Example 6. This is probably because the battery in Example 6 achieves sufficient charging to the full charge in each unit cell by the gas generation even though the capacities of the unit cell vary, whereas the battery in Comparative Example 2 was charged insufficiently due to the capacity regulation by the unit cell with a small capacity and the overcharged cell deteriorated by going through cycles.

The present invention achieves a battery chemistry that protects both overcharge and overdischarge (reverse charging), and provides a non-aqueous electrolyte secondary battery that can simplify the control over a battery pack or a battery module, by appropriately selecting a combination of the positive electrode active material, the negative electrode active material, and the electrolyte, and the balance between the positive electrode capacity and the negative electrode capacity. A non-aqueous electrolyte secondary battery of the present invention has a high energy density, is environmentally-friendly, and is useful for a replacement technique for lead-acid batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising a unit cell including a sheet-shaped positive electrode, a sheet-shaped negative electrode, a separator disposed between said positive electrode and said negative electrode, and a non-aqueous electrolyte, wherein:
    said non-aqueous electrolyte contains a solvent including 50 vol % or more of acetonitrile,
    said positive electrode includes a positive electrode active material and a positive current collector including aluminum or an aluminum alloy, said positive current collector contacting said non-aqueous electrolyte on both sides of said positive electrode,
    said positive electrode includes a positive electrode active material comprising a lithium-containing manganese composite oxide having a spinel structure,
    said negative electrode includes a negative electrode active material comprising a lithium-containing titanium oxide and a negative current collector including aluminum or an aluminum alloy, said negative current collector contacting said non-aqueous electrolyte on both sides of said negative electrode;
    a positive electrode capacity is greater than a negative electrode capacity, and at least a portion of said acetonitrile is capable of being gasified during the overcharging of said battery;
    said unit cell further includes a third metal electrode; and
    said third metal electrode includes at least one selected from the group consisting of nickel, copper, iron, and stainless steel.

2. The non-aqueous electrolyte secondary battery in accordance with claim 1, comprising a plurality of said unit cells, and being capable of compensating capacity variation between said unit cells.

3. The non-aqueous electrolyte secondary battery in accordance with claim 1, wherein said at least a portion of said acetonitrile is capable of being gasified in the proximity of said negative electrode.

4. The non-aqueous electrolyte secondary battery in accordance with claim 1, wherein said at least a portion of said acetonitrile is capable of being gasified in the negative electrode potential range of 1.5 V to 0.3 V relative to a lithium metal.

5. The non-aqueous electrolyte secondary battery in accordance with claim 1, wherein said lithium-containing titanium oxide is $Li_{3+3x}Ti_{6-3x}O_{12}$ where $0 \leq x \leq 1/3$.

6. The non-aqueous electrolyte secondary battery in accordance with claim 5, wherein said lithium-containing titanium oxide comprises a mixture of crystal particles having a particle size of 0.1 μm to 8 μm and secondary particles of the crystal particles, said secondary particles having a particle size of 2 μm to 30 μm.

7. The non-aqueous electrolyte secondary battery in accordance with claim 1, wherein said non-aqueous electrolyte further includes a dinitrile compound.

8. The non-aqueous electrolyte secondary battery in accordance with claim 7, wherein said dinitrile compound is malononitrile, succinonitrile, glutaronitrile, or adiponitrile.

9. The non-aqueous electrolyte secondary battery in accordance with claim 1, wherein said non-aqueous electrolyte further contains methyl acetate, methyl butyrate, or γ-butyrolactone as a solvent.

10. The non-aqueous electrolyte secondary battery in accordance with claim 1, wherein said spinel lithium-containing manganese composite oxide is $Li_{1+x}Mn_{2-x-y}A_yO_4$ where A is at least one selected from the group consisting of Al, Ni, and Fe, $0 \leq x \leq 1/3$, and $0 \leq y \leq 0.6$.

11. The non-aqueous electrolyte secondary battery in accordance with claim 1, wherein said positive electrode includes a layer-structured $Li_{1+\alpha}[Me]O_2$ where Me is a transition metal including Ni and at least one selected from the group consisting of Mn, Fe, Co, Ti, and Cu, and $0 \leq \alpha \leq 0.2$, as said positive electrode active material.

12. The non-aqueous electrolyte secondary battery in accordance with claim 11, wherein said positive electrode active material is $Li_{1+\alpha}[Ni_{1/2-z}Mn_{1/2-z}Co_{2z}]O_2$ where $0 \leq \alpha \leq 0.2$, and $z \leq 1/6$.

13. A non-aqueous electrolyte secondary battery comprising a unit cell including a sheet-shaped positive electrode, a sheet-shaped negative electrode, a separator disposed between said positive electrode and said negative electrode, and a non-aqueous electrolyte, a positive electrode capacity being greater than a negative electrode capacity,
    wherein said positive electrode includes a positive electrode active material comprising a spinel lithium composite oxide represented by the general formula:

$$Li_{1+x}M_{2-x}O_4$$

where M is at least Mn and Al, and x>0, and a positive current collector including aluminum or an aluminum alloy, said positive current collector contacting said non-aqueous electrolyte on both sides of said positive electrode;
    said negative electrode includes a negative electrode active material comprising a spinel titanium oxide and a negative current collector including aluminum or an aluminum alloy, said negative current collector contacting said non-aqueous electrolyte on both sides of said negative electrode;
    said non-aqueous electrolyte includes a solvent;
    said solvent includes 50 vol % or more of acetonitrile;

said unit cell further includes a third metal electrode; and
said third metal electrode includes at least one selected from the group consisting of nickel, copper, iron, and stainless steel.

14. A non-aqueous electrolyte secondary battery comprising a unit cell including a positive electrode, a negative electrode, a separator disposed between said positive electrode and said negative electrode, and a non-aqueous electrolyte, a positive electrode capacity being greater than a negative electrode capacity,
wherein said positive electrode includes a positive electrode active material comprising a spinel lithium composite oxide represented by the general formula:

$$Li_{1+x}Mn_{2-x-y}A_yO_4$$

where A is Al and at least one selected from the group consisting of Ni and Fe, $0 \leq x \leq 1/3$, and $0 \leq y \leq 0.6$, and a positive current collector including aluminum or an aluminum alloy, said positive current collector contacting said non-aqueous electrolyte on both sides of said positive electrode;
said negative electrode includes a negative electrode active material comprising a lithium-containing titanium oxide represented by the general formula:

$$Li_{3+3x}Ti_{6-3x}O_{12}$$

where $0 \leq x \leq 1/3$ and a current collector including aluminum or an aluminum alloy, said negative current collector contacting said non-aqueous electrolyte on both sides of said negative electrode;
said non-aqueous electrolyte includes a solvent;
said solvent includes 50 vol % or more of acetonitrile;
said unit cell further includes a third metal electrode; and
said third metal electrode includes at least one selected from the group consisting of nickel, copper, iron, and stainless steel.

15. The non-aqueous electrolyte secondary battery in accordance with claim 1, further comprising a gas releasing valve.

16. The non-aqueous electrolyte secondary battery in accordance with claim 13, further comprising a gas releasing valve.

17. The non-aqueous electrolyte secondary battery in accordance with claim 14, further comprising a gas releasing valve.

18. The non-aqueous electrolyte secondary battery in accordance with claim 15, wherein
said gas releasing valve is resettable, and has a structure that enables refilling said non-aqueous electrolyte when said non-aqueous electrolyte is decreased by gasification of acetonitrile.

19. The non-aqueous electrolyte secondary battery in accordance with claim 16, wherein
said gas releasing valve is resettable, and has a structure that enables refilling said non-aqueous electrolyte when said non-aqueous electrolyte is decreased by gasification of acetonitrile.

20. The non-aqueous electrolyte secondary battery in accordance with claim 17, wherein
said gas releasing valve is resettable, and has a structure that enables refilling said non-aqueous electrolyte when said non-aqueous electrolyte is decreased by gasification of acetonitrile.

21. A non-aqueous electrolyte secondary battery comprising a unit cell including a sheet-shaped first electrode, a sheet-shaped second electrode, a separator disposed between said first electrode and said second electrode, and a nonaqueous electrolyte, wherein:
said non-aqueous electrolyte contains acetonitrile or propionitrile as a solvent,
said first electrode is a positive electrode including a positive electrode active material and a positive current collector including aluminum or an aluminum alloy, said positive current collector contacting said non-aqueous electrolyte on both sides of said positive electrode,
said second electrode is a negative electrode including a lithium-containing titanium oxide as a negative electrode material and a negative current collector including aluminum or an aluminum alloy, said negative current collector contacting said non-aqueous electrolyte on both sides of said negative electrode,
a positive electrode capacity is greater than a negative electrode capacity,
at least a portion of said acetonitrile or propionitrile is capable of being gasified during the overcharging of said battery,
said unit cell further includes a third metal electrode, and
said third metal electrode includes at least one selected from the group consisting of nickel, copper, iron, and stainless steel.

* * * * *